US007362595B2

(12) United States Patent
Noma (10) Patent No.: US 7,362,595 B2
(45) Date of Patent: Apr. 22, 2008

(54) DC-DC CONVERTER

(75) Inventor: Takashi Noma, Moriyama (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 11/614,557

(22) Filed: Dec. 21, 2006

(65) Prior Publication Data

US 2007/0195565 A1   Aug. 23, 2007

Related U.S. Application Data

(63) Continuation of application No. PCT/JP2004/014343, filed on Sep. 30, 2004.

(30) Foreign Application Priority Data

Jul. 12, 2004   (JP)   ............................ 2004-205056

(51) Int. Cl.
*H02M 3/18* (2006.01)
(52) U.S. Cl. ........................ 363/59; 323/224; 361/111
(58) Field of Classification Search ............ 363/44–49, 363/56, 59, 60, 63; 361/18, 91, 1, 111, 114
See application file for complete search history.

(56) References Cited

U.S. PATENT DOCUMENTS

| | | | | |
|---|---|---|---|---|
| 5,177,676 A | * | 1/1993 | Inam et al. .................... | 363/80 |
| 5,414,341 A | * | 5/1995 | Brown ......................... | 323/268 |
| 5,457,624 A | * | 10/1995 | Hastings ...................... | 363/127 |
| 5,920,475 A | * | 7/1999 | Boylan et al. ............... | 363/127 |
| 6,778,417 B2 | * | 8/2004 | Itakura et al. ................ | 363/97 |

FOREIGN PATENT DOCUMENTS

JP   2003-259627   9/2003

OTHER PUBLICATIONS

"Low-Input Voltage-Mode Synchronous Buck Controller", Texas Instruments Jan. 2002.

* cited by examiner

*Primary Examiner*—Rajnikant B. Patel
(74) *Attorney, Agent, or Firm*—Ostrolenk, Faber, Gerb & Soffen, LLP (57) ABSTRACT

A DC-DC converter includes a regeneration preventing circuit to bring a synchronous rectifying switching element to an OFF-state when an output of an error amplifier is lower than a lower-limit potential of a triangular-wave signal, that is, when the output of the error amplifier deviates from a voltage range of the triangular-wave signal in a side (direction), which would cause a smaller ON duty ratio of a main switching element. This configuration prevents a rise of voltage in an input side due to a regenerative operation at startup when a pre-bias voltage exists. Also, the configuration prevents fluctuations of an output voltage at a sudden change of a load current and a drop of the output voltage at transition from a soft start state to a normal operation state when the load current is small.

4 Claims, 4 Drawing Sheets

FIG. 1

$0 < D < 1$
$vo = vi \times D$
$io = ii \div D$ (a)

$0 < D < 1$
$vo = vi \div D$
$io = ii \times D$ (b)

DC-DC CONVERTER

CROSS-REFERENCE TO RELATED APPLICATIONS

This is a continuation of PCT/JP04/14343 filed Sep. 30, 2004, which claims priority of JP2004-205056 filed Jul. 12, 2004, incorporated by reference.

BACKGROUND OF THE INVENTION

1. Technical Field

The present invention relates to a synchronous rectifying DC-DC converter.

2. Background Art

Figure 1:
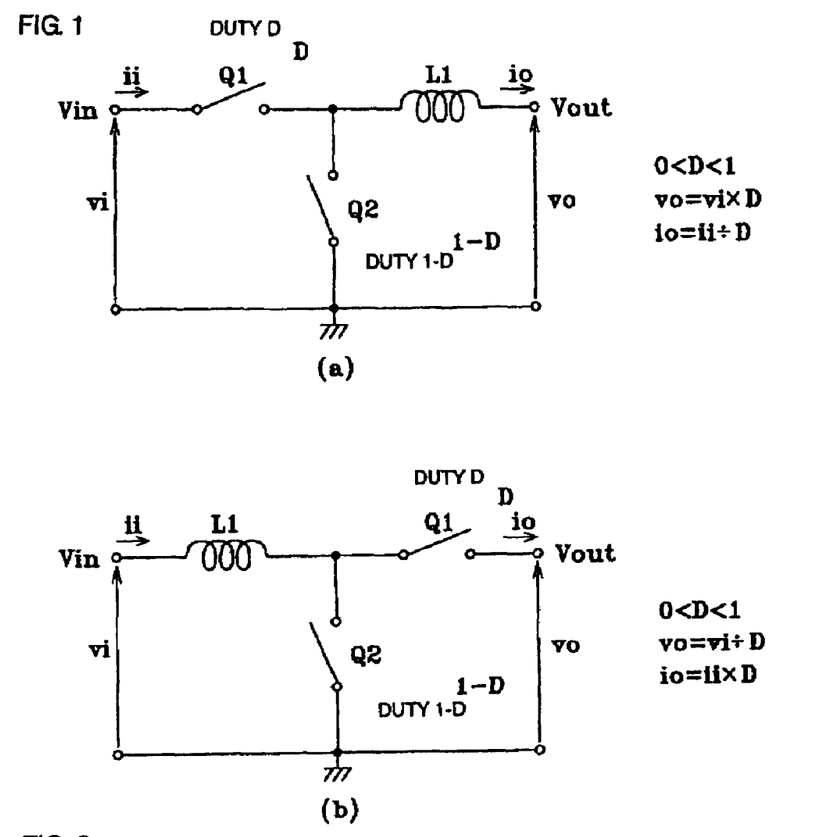
FIG. 1 includes circuit diagrams illustrating a principle of a synchronous rectifying DC-DC converter.

FIG. 1 shows two types of synchronous rectifying DC-DC converter circuit. Herein, FIG. 1($a$) shows a step-down DC-DC converter and FIG. 1($b$) shows a step-up DC-DC converter. Both circuits are simply illustrated so that a concept of an operation can be seen. A smoothing capacitor is not shown in the figures.

As shown in FIG. 1($a$), in the step-down DC-DC converter, one end of a switching element Q1 connects to a voltage input terminal Vin and the other end connects to a voltage output terminal Vout via a choke coil L1. A node between the switching element Q1 and the choke coil L1 is grounded via a switching element Q2. In this case, the switching element Q1 serves as a main switching element and the switching element Q2 serves as a synchronous rectifying switching element playing a role of a flywheel diode.

In the step-down DC-DC converter having the above-described configuration, when an input voltage vi is applied to the voltage input terminal Vin and when the switching elements Q1 and Q2 are alternately turned ON and OFF with an ON duty ratio of the switching element Q1 being set to D (0<D<1), an output voltage vo is output to the voltage output terminal Vout in accordance with a relational expression vo=vi×D. In the following description, "duty ratio" means an ON duty ratio (duty cycle). When an OFF duty ratio is to be referred to, that will be clearly specified.

On the other hand, as shown in FIG. 1($b$), in the step-up DC-DC converter, one end of a choke coil L1 connects to a voltage input terminal Vin and the other end connects to a voltage output terminal Vout via a switching element Q1. A node between the choke coil L1 and the switching element Q1 is grounded via a switching element Q2. In this case, the switching element Q2 serves as a main switching element and the switching element Q1 serves as a synchronous rectifying switching element.

In the DC-DC converter having the above-described configuration, when an input voltage vi is applied to the voltage input terminal Vin and when the switching elements Q1 and Q2 are alternately turned ON and OFF while an ON duty ratio of the switching element Q1 is set to D (0<D<1), an output voltage vo is output to the voltage output terminal Vout in accordance with a relational expression vo=vi÷D.

Each of the above-described circuits is based on the assumption that the efficiency is 100%. Actually, dead time when the two switching elements are OFF is required in order to prevent a short circuit, and means for realizing that configuration may be required. However, that point is not essential to the present invention, and thus is not described here.

As can be understood by comparing the circuit configurations of the two types of DC-DC converter shown in FIG. 1, the step-down circuit is equivalent to the step-up circuit when viewed from the output side to the input side, although the roles of the main switching element and the synchronous rectifying switching element change.

In a diode rectifying method, a diode is used instead of a synchronous rectifying switching element, for example, a diode is used instead of the switching element Q2. In this case, a step-down circuit is not equivalent to a step-up circuit even when viewed from the output side to the input side because a reverse current cannot flow through the diode.

In a DC-DC converter, a set value of an output voltage is slowly raised in many cases so that a large current to charge a smoothing capacitor (output capacitance) from zero does not flow through each switching element at startup. This is called soft start control. For example, when the soft start control is performed in a step-down DC-DC converter, a duty ratio of a main switching element (the switching element Q1 in the DC-DC converter shown in FIG. 1) is gradually increased from zero to a value that depends on input and output voltages.

In recent years, various types of ICs require a plurality of power supply voltages due to the high performance thereof. Accordingly, power supply voltages are supplied to an IC by connecting a plurality of DC-DC converters of different output voltages to the IC in some cases. In those cases, depending on the order of applying the respective power supply voltages, that is, depending on the order of starting the respective DC-DC converters, a voltage from one power supply (DC-DC converter) may leak to a terminal to which a power supply voltage from another DC-DC converter is to be applied. This means that a DC voltage is applied in advance to an output terminal of the DC-DC converter that is still to be started. This state is called a pre-bias state. A voltage applied to the output terminal of the DC-DC converter before startup is called a pre-bias voltage.

As described above, when soft start control is performed in the step-down DC-DC converter, the ON duty ratio of the main switching element (switching element Q1) is gradually increased from zero. When viewed from the output side to the input side, this is equivalent to gradually increasing the duty ratio of the synchronous rectifying switching element (switching element Q1) from zero in the step-up DC-DC converter (while gradually decreasing a large duty ratio in the main switching element). Thus, voltage rises by 1/D of the voltage of the voltage output terminal just after startup, and the risen voltage appears in the input side.

For example, in a step-down DC-DC converter having an input voltage of 5 V and an output voltage of 2.5 V, assume that a pre-bias voltage of 1 V exists at the voltage output terminal and that D=0.05 just after startup. In that case, a voltage of 1÷0.05=20 V occurs at the input side because of the step-up operation. This voltage is four times the input voltage at that time, so that the DC-DC converter can be destroyed or an overvoltage protecting circuit can malfunction.

Such an operation of returning energy from the output side to the input side is called a regenerative operation. The regenerative operation is normally performed during normal operation when a load current is small (load is light) in a synchronous rectifying DC-DC converter. However, since the ON duty ratio of the main switching element depends on input and output voltages during normal operation, an extreme step-up operation from the output side to the input side is not performed. Two documents of background interest are Patent Document 1: Japanese Unexamined Patent Application Publication No. 2003-259627; and Nonpatent Document 1: TPS40001 data sheet, Texas Instruments Incorporated, incorporated by reference.

Patent Document 1 discloses a circuit to solve the above-described problem of the regenerative operation at the soft start. In the DC-DC converter disclosed in Patent Document 1, a direction of a current flowing through a choke coil is observed, and a synchronous rectifying switching element is turned OFF upon detection of a reverse current. Accordingly, a reverse current does not flow through the synchronous rectifying switching element. That is, the regenerative operation is completely prohibited. Therefore, this DC-DC converter, which is a synchronous rectifying type, substantially functions as a constant diode-rectifying DC-DC converter. Although not directly presented as a problem in Patent Document 1, this configuration prevents a pre-bias voltage from rising and existing at the input side at startup.

Also, Nonpatent Document 1 discloses a circuit to solve the above-described problem. In the DC-DC converter disclosed in Nonpatent Document 1, the same control as that in the DC-DC converter disclosed in Patent Document 1, that is, control for preventing a reverse current from flowing through a synchronous rectifying switching element, is performed only at startup by the soft start function, and the synchronous rectifying switching element is allowed to perform the normal operation of a synchronous rectifying circuit after the starting period has passed. In this case, too, the DC-DC converter substantially functions as a diode-rectifying DC-DC converter at startup, and thus a pre-bias voltage can be prevented at the input side.

The DC-DC converter disclosed in Patent Document 1 is based on the assumption that no regenerative operation is performed because a predetermined load current stably flows during a normal operation, and thus no substantial problem will occur even if the regenerative operation is prohibited. However, a problem arises if the DC-DC converter is used under a condition where a load current significantly varies during a normal operation. That is, an output voltage significantly varies if a load current varies during a normal operation.

For example, assume a case where a large load current rapidly becomes small. At this time, an output voltage transiently rises. Upon detecting the rise of the output voltage, the DC-DC converter tries to drop the output voltage by decreasing the ON duty ratio of the main switching element and by increasing the ON duty ratio of the synchronous rectifying switching element. In a typical synchronous rectifying DC-DC converter, a reverse current flows through a choke coil, a synchronous rectifying switching element, and a main switching element, so that electric power can be regenerated in the input side. Accordingly, a rise of the output voltage can be suppressed and a predetermined voltage can be recovered in a short time. However, the DC-DC converter disclosed in Patent Document 1 substantially functions as a diode-rectifying DC-DC converter, and it is constantly prohibited that a reverse current flows through a choke coil. This causes a problem that an output voltage is kept high for a long time. This problem occurs because a regenerative operation is prohibited during a normal operation.

On the other hand, the DC-DC converter disclosed in Nonpatent Document 1 functions as a synchronous rectifying DC-DC converter during a normal operation. Thus, the regenerative operation can be performed, and the problem in the circuit according to Patent Document 1 does not occur.

However, another problem exists: depending on a condition of an output current, an output voltage significantly drops at transition from a diode rectifying operation state (a state where a reverse current in a choke coil is prohibited) during a starting period with soft start, to a normal synchronous rectification state (a state where a reverse current is permitted or a regenerative operation is permitted).

For example, assume a case where a load current is very small during a starting period. As described above, the DC-DC converter substantially operates as a diode rectifying DC-DC converter because the regenerative operation is prohibited during the starting period. In this case, the ON duty ratio of the main switching element does not depend on a difference between input and output voltages, unlike in a case where the regenerative operation can be performed, but may be a duty ratio capable of supplying power required by the DC-DC converter to maintain its own operation. Thus, the ON duty ratio of the main switching element is very small, so that the main switching element is in an ON-state for only a short time in one period. For example, when an input voltage is 5 V and when an output voltage is 2.5 V, the ON duty ratio of the main switching element should be $D=0.5$ in a normal synchronous rectifying operation state. However, a state where $D=0.01$ continues if the regenerative operation is prohibited.

After the starting period ends and a normal synchronous rectification state where a reverse current in a choke coil is permitted occurs, the ON duty ratio of the main switching element changes from a very small ratio to an original ratio, so that an output voltage at once drops significantly. A control system detects the drop of the output voltage and tries to increase the duty ratio so that the output voltage reaches a predetermined value. However, the drop of the output voltage continues during the response time. This problem is also due to prohibition of the regenerative operation, although only during a starting period.

SUMMARY OF THE INVENTION

The present invention is directed to solving the above-described problems and provides a DC-DC converter capable of preventing a rise of voltage at an input side at startup when a pre-bias voltage exists, preventing fluctuations of an output voltage at a sudden change of a load current, and preventing a drop of the output voltage at switching of a control state when the load current is small.

In order to achieve the above-described objects, a DC-DC converter according to the present invention may include a main switching element; a synchronous rectifying switching element; a choke coil; an error amplifier to compare a voltage corresponding to an output voltage with a reference voltage and output an error component; and an oscillator to output an oscillator signal periodically fluctuating within a predetermined voltage range. The DC-DC converter in this embodiment of the invention compares the output of the error amplifier with the oscillator signal and alternately turns ON and OFF the main switching element and the synchronous rectifying switching element on the basis of the comparison result so as to control the output voltage to be constant. The DC-DC converter may also include a regeneration preventing circuit to bring the synchronous rectifying switching element to an OFF-state when the output of the error amplifier deviates from the voltage range of the oscillator signal in a direction of a smaller ON duty ratio of the main switching element.

In the DC-DC converter according to an embodiment of the present invention, the reference voltage may be set so as to rise from zero for a predetermined time period after startup and to become constant after reaching a predetermined voltage corresponding to an output set voltage.

The DC-DC converter according to an embodiment of the present invention further may include a regeneration preventing circuit stopping circuit to stop an operation of the regeneration preventing circuit after the reference voltage has reached the predetermined voltage after startup.

The DC-DC converter according to embodiments of the present invention thus may include the regeneration preventing circuit to bring the synchronous rectifying switching element to an OFF-state when the output of the error amplifier deviates from the voltage range of the oscillator signal in a direction of a smaller ON duty ratio of the main switching element. With this configuration, even if a pre-bias voltage occurs in an output terminal at soft start, it can be prevented that the pre-bias voltage significantly rises and appears in an input side. On the other hand, in an operation state where the main switching element and the synchronous rectifying switching element are alternately turned ON and OFF either at startup by soft start or during a normal operation, a regenerative operation is not prohibited. Thus, a problem that fluctuation of an output voltage becomes significant due to a change of a load current during a normal operation can be prevented. Furthermore, a problem that an output voltage significantly drops at transition from a soft start state of startup to a normal operation state under a small load current condition can be prevented.

By further providing the stopping circuit for the regeneration preventing circuit, to stop an operation of the regeneration preventing circuit after the reference voltage has reached the predetermined voltage after startup, even if a load current suddenly becomes small during a normal operation, if an output voltage rises, and if the ON duty ratio of the main switching element becomes zero, the risen output voltage can be rapidly dropped because a regenerative operation is not prohibited.

Other features and advantages of the present invention will become apparent from the following description of embodiments of invention which refers to the accompanying drawings.

DETAILED DESCRIPTION OF EMBODIMENTS OF THE INVENTION

First Embodiment

Figure 2:
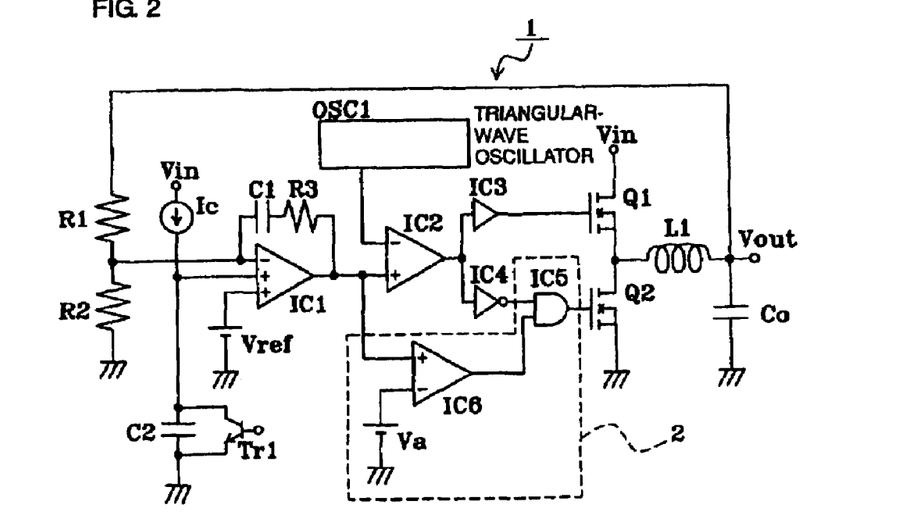
FIG. 2 is a circuit diagram of a DC-DC converter according to an embodiment of the present invention.

FIG. 2 is a circuit diagram of a DC-DC converter according to an embodiment of the present invention. In FIG. 2, the DC-DC converter 1 includes, as a basic configuration, a FET Q1 serving as a main switching element, a FET Q2 serving as a synchronous rectifying switching element, a choke coil L1, a smoothing capacitor Co, a three-input error amplifier IC1, and a triangular-wave oscillator OSC1 that is typical as an oscillator for a PWM control circuit.

A drain of the FET Q1 connects to a voltage input terminal Vin and a source thereof connects to a voltage output terminal Vout via the choke coil L1. A drain of the FET Q2 connects to a node between the FET Q1 and the choke coil L1 and a source thereof is grounded. The smoothing capacitor Co is connected between the voltage output terminal Vout and ground.

The error amplifier IC1 is supplied with power between the voltage input terminal Vin and the ground so as to operate by a single power supply. A feedback circuit consisting of a series circuit including a resistor R3 band a capacitor C1 is provided between an output terminal and an inverting input terminal of the error amplifier IC1.

Resistors R1 and R2 connected in series between the voltage output terminal Vout and the ground function as an output voltage detecting circuit. A node between the resistors R1 and R2 is a point where a voltage corresponding to an output voltage can be obtained and connects to the inverting input terminal of the error amplifier IC1.

A constant current source Ic and a capacitor C2 connected in series between the voltage input terminal Vin and the ground as a reference voltage generating circuit for soft start. Both ends of the capacitor C2 connect to a collector and an emitter of a transistor Tr1 to discharge the capacitor C2 when the DC-DC converter 1 is not operated. A node between the constant current source Ic and the capacitor C2 connects to a first non-inverting input terminal of the error amplifier IC1.

A second non-inverting input terminal of the error amplifier IC1 connects to a reference voltage source Vref. The reference voltage source Vref outputs a reference voltage vref to set an output voltage.

The output terminal of the error amplifier IC1 connects to a non-inverting input terminal of a comparator IC2. An inverting input terminal of the comparator IC2 connects to the triangular-wave oscillator OSC1. An output signal (oscillation signal) from the triangular-wave oscillator OSC1 is set so as to fluctuate between an upper-limit potential and a lower-limit potential between a potential input from the voltage input terminal Vin and a ground potential.

An output terminal of the comparator IC2 connects to a gate of the FET Q1 via a buffer circuit IC3 and also connects to a gate of the FET Q2 via an inverting circuit IC4 and a first input terminal and an output terminal of an AND circuit IC5.

Also, a comparator IC6 is provided. A non-inverting input terminal thereof connects to the output terminal of the error amplifier IC1 and an inverting input terminal thereof connects to a reference voltage source Va. A reference voltage va generated by the reference voltage source Va matches the lower-limit potential of an output signal from the triangular-wave oscillator OSC1. An output terminal of the comparator IC6 connects to a second input terminal of the AND circuit IC5. The comparator IC6, the reference voltage source Va, and the AND circuit IC5 constitute a regeneration preventing circuit 2.

Hereinafter, an operation of the DC-DC converter 1 in both cases where a pre-bias exists and does not exist is described. Assume that an input voltage vi applied to the voltage input terminal Vin is 5 V and that an output voltage vo output from the voltage output terminal Vout is 2.5 V. The values of the resistors R1 and R2 are equal to each other so that the reference voltage vref supplied from the reference voltage source Vref is half of the output voltage vo, that is, 1.25 V, and that a divided voltage generated by the resistors R1 and R2 of the output voltage detecting circuit is 1.25 V. An output signal from the triangular-wave oscillator OSC1 (hereinafter refereed to as a triangular-wave signal) is set so that the lower-limit potential thereof is 0.5 V and that the upper-limit potential thereof is 1.0 V. Thus, the reference voltage va generated by the reference voltage source Va is set to 0.5 V, which is equal to the lower-limit potential of the triangular-wave signal. The reference voltage va may be a little lower than 0.5 V in view of a variation in the lower-limit potential of the triangular-wave signal. Before startup, the capacitor C2 is discharged by turning ON the transistor Tr1, and then the transistor Tr1 is in an OFF-state.

First, an operation performed when no pre-bias exists is described. When no pre-bias exists, the output voltage vo of the voltage output terminal Vout of the DC-DC converter 1 is 0 V in an initial state. Accordingly, a voltage input to the inverting input terminal of the error amplifier IC1 after voltage dividing by the resistors R1 and R2 is also 0 V. If startup is performed in this state, charging of the capacitor C2 by the constant current source Ic starts at a predetermined time constant. The time constant depends on a current value of the constant current source Ic and a capacitance of the capacitor C2 and is determined in accordance with a condition of soft start. After the capacitor C2 is charged to any extent, a charging voltage of the capacitor C2 (a voltage input to the first non-inverting input terminal of the error amplifier IC1) becomes higher than 0 V, which is the voltage of the inverting input terminal, so that the output voltage of the error amplifier IC1 starts to rise.

However, during a short period when the voltage is lower than the lower-limit potential of the triangular-wave signal, the voltage of the inverting input terminal is higher than the voltage of the non-inverting input terminal in the comparator IC2, and thus the output thereof is in L level. Accordingly, a signal of L level is applied to the gate of the FET Q1, so that the FET Q1 is kept in on OFF-state. On the other hand, an output of the error amplifier IC1 is also lower than the reference voltage va of 0.5 V, and thus an output of the comparator IC6 is also in L level. Accordingly, an output of the AND circuit IC5 is also in L level, a signal of L level is applied to the gate of the FET Q2, and the FET Q2 is kept in an OFF-state. That is, the regeneration preventing circuit 2 functions. Therefore, both of the two FETs Q1 and Q2 are in an OFF-state in this stage.

The output voltage of the error amplifier IC1 quickly rises and exceeds 0.5 V, which is the lower-limit potential of the triangular-wave signal. Accordingly, the output of the error amplifier IC1 also exceeds the reference voltage va of 0.5 V. This causes the output of the comparator IC6 to become H level, and the AND circuit IC5 functions simply as a buffer circuit with respect to an output signal from the inverting circuit IC4. That is, the regeneration preventing circuit 2 stops its function at this time.

The comparator IC2 compares the triangular-wave signal with the output of the error amplifier IC1, the output being within the voltage range of the triangular-wave signal. The comparator IC2 periodically outputs a signal of H level when the triangular-wave signal is lower, and periodically outputs a signal of L level when the triangular-wave signal is higher. When the output of the comparator IC2 is in H level, a signal of H level is applied to the gate of the FET Q1 and the FET Q1 is brought into an ON-state, and a signal of L level that is logically inverted by the inverting circuit IC4 is applied to the gate of the FET Q2 and the FET Q2 is brought into an OFF-state. On the other hand, when the output of the comparator IC2 is in L level, the FET Q1 is turned OFF and the FET Q2 is turned ON. In this way, switching of the FETs Q1 and Q2 is performed.

Even when the output of the error amplifier IC1 is within the voltage range of the triangular-wave signal, if the output is relatively low, a period when the triangular-wave signal is higher than the output of the error amplifier IC1 is long, and thus a period when the output of the comparator IC2 is in L level becomes long and the duty ratio of the main switching element becomes small. On the other hand, if the output of the error amplifier IC1 is relatively high, the duty ratio of the main switching element becomes large. Therefore, the above-described state where the regeneration preventing circuit 2 functions, that is, a state where the output voltage of the error amplifier IC1 is lower than the lower-limit potential of the triangular-wave signal, corresponds to a case where the output of the error amplifier deviates from the voltage range of the oscillator signal in the side of a smaller ON duty ratio of the main switching element. Accordingly, the regeneration preventing circuit 2 functions when the output of the error amplifier IC1 deviates from the voltage range of the oscillator signal in the side of a smaller ON duty ratio of the main switching element, so as to bring the synchronous rectifying switching element to an OFF-state.

After the output voltage of the error amplifier IC1 enters the voltage range of the triangular-wave signal and after the FETs Q1 and Q2 start a switching operation, the voltage vo of the output terminal Vout starts to rise. The ON duty ratio of the FET Q1 is small at first because the output of the error amplifier IC1 rises from a low voltage. However, the duty ratio quickly becomes a value that depends on a relationship between an input voltage and an output voltage even if a load current is small, because the FET Q2 performs a synchronous rectifying operation. For example, if the voltage applied to the first non-inverting input terminal of the error amplifier (charging voltage of the capacitor C2) at some point is a voltage to set an output voltage to 1 V, the voltage is 0.6 V with which the ON duty ratio of the FET Q1 becomes 1 V (output voltage)/5 V (input voltage)=0.2. The output voltage vo is 1 V. However, the charging voltage of the capacitor C2 continues to rise, so that the output voltage vo rises accordingly. The soft start is realized in this way.

When the charging voltage of the capacitor C2 exceeds 1.25 V, a target to be compared with a voltage applied to the inverting input terminal in the error amplifier IC1 changes to the reference voltage vref of 1.25 V that is applied to the second non-inverting input terminal. Thus, the output voltage vo is controlled to become stable at a value corresponding to the reference voltage vref, that is, at 2.5 V.

According to the above-described operation, the ON duty ratio of the FET Q1 is zero when the output voltage of the error amplifier IC1 is lower than the lower-limit potential of the triangular-wave signal. In this case, the FET Q2 would be turned ON in a typical synchronous rectifying circuit. In the DC-DC converter 1, however, the regeneration preventing circuit 2 allows the FET Q2 as a synchronous rectifying switching element to be turned OFF. That is, neither of the switching elements performs a switching operation in this stage. After the output voltage of the error amplifier IC1 exceeds the lower-limit potential of the triangular-wave signal and after switching of the FET Q1 becomes possible, the regeneration preventing circuit 2 stops functioning, so that switching of the FET Q2 is performed. Therefore, a synchronous rectifying operation is performed even in a starting period of soft start. Furthermore, after the starting period ends, the reference voltage which has been rising becomes constant and the synchronous rectifying operation continues. Thus, a diode rectifying operation is not performed in the DC-DC converter 1.

Next, an operation performed when a pre-bias exists is described. For example, assume that a pre-bias of 1 V has been applied to the output terminal Vout. In this case, 1 V is divided by the resistors R1 and R2 into 0.5 V, which is applied to the inverting input terminal of the error amplifier IC1 before startup.

If startup is performed in this state, charging of the capacitor C2 by the constant current source Ic starts. Note that, for some time until the charging voltage of the capacitor C2 reaches 0.5 V, the output of the error amplifier IC1 is kept at 0 V because the voltage of the inverting input terminal is higher than that of the non-inverting input terminal in the error amplifier IC1. Thus, the FET Q1 maintains an OFF-state while the output of the comparator IC2 is kept at L level. Of course, the output of the comparator IC6 is at L level because the output of the error amplifier IC1 is lower than the reference voltage va of 0.5 V. Accordingly, the regeneration preventing circuit 2 functions and the FET Q2 maintains an OFF-state. That is, both of the two FETs are in an OFF-state in this stage.

After the charging voltage of the capacitor C2 exceeds 0.5 V, the voltage input to the first non-inverting input terminal of the error amplifier IC1 becomes higher than the voltage applied to the inverting input terminal, so that the voltage of the output terminal thereof starts to rise as in the startup without a pre-bias. Note that, since the output of the comparator IC2 is at L level for a short time when the voltage is lower than the lower-limit potential of the triangular-wave signal, a signal of L level is applied to the gate of the FET Q1 and the FET Q1 maintains an OFF-state. Also, the FET Q2 maintains an OFF-state because the regeneration preventing circuit 2 functions.

After the output voltage of the error amplifier IC1 exceeds 0.5 V, the output of the comparator IC6 becomes H level, so that the AND circuit IC5 functions simply as a buffer circuit with respect to an output signal from the inverting circuit IC4. That is, the regeneration preventing circuit 2 stops functioning.

Then, the comparator IC2 compares the triangular-wave signal with the output voltage of the error amplifier IC1. The comparator IC2 periodically outputs a signal of H level when the triangular-wave signal is lower, and periodically outputs a signal of L level when the triangular-wave signal higher, so that switching of the FETs Q1 and Q2 starts. At this time, the FET Q2 performs a synchronous rectifying operation because the regeneration preventing circuit 2 does not function.

In this case, the ON duty ratio of the FET Q1 is small and the ON duty ratio of the FET Q2 is large just after the switching has started, so that a regenerative operation causing step-up from the output side to the input side can be performed. At this time, however, the capacitor C2 is charged to a voltage corresponding to the pre-bias voltage, and thus a set value of the output voltage matches the pre-bias voltage. Also, a synchronous rectifying operation of the FET Q2 is possible. Therefore, the output voltage of the error amplifier IC1 rapidly rises so that the output voltage of the DC-DC converter 1 becomes equal to 0.5 V, which is the pre-bias voltage, and the ON duty ratio of the FET Q1 rapidly increases. In this example, the input voltage vi is 5 V and the output voltage vo at this time is to be 0.5 V, which is equal to the pre-bias voltage, and thus the ON duty ratio of the FET Q1 quickly reaches 0.1. Then, the output voltage vo becomes 0.5 V, which is equal to the pre-bias voltage. Thus, the regenerative operation causing a step-up from the output side to the input side ends in a very short time, so that a step-up operation is not substantially performed.

Charging of the capacitor C2 continues thereafter. However, since the output voltage exceeds the pre-bias voltage, the DC-DC converter 1 operates in the same manner as in the case where no pre-bias exists. That is, the output voltage vo continues to rise until the charging voltage of the capacitor C2 exceeds 1.25 V reaches 2.5 V when the charging voltage of the capacitor C2 exceeds 1.25 V, and then becomes stable at 2.5 V According to the above-described operation, the FET Q1 serving as a main switching element is in an OFF-state until the reference voltage reaches a value corresponding to the pre-bias voltage, and also the FET Q2 serving as a synchronous rectifying switching element is in an OFF-state due to the regeneration preventing circuit. Even after the reference voltage has reached the value corresponding to the pre-bias voltage, not only the FET Q1 serving as a main switching element but also the FET Q2 serving as a synchronous rectifying switching element is in an OFF-state due to the regeneration preventing circuit until the output of the error amplifier IC1 reaches the lower-limit potential of the triangular-wave signal. That is, neither of the switching elements performs a switching operation in this stage. After the output of the error amplifier IC1 exceeds the lower-limit potential of the triangular-wave signal and switching of the FET Q1 becomes possible, the regeneration preventing circuit stops functioning, so that switching of the FET Q2 can be performed. That is, a synchronous rectifying operation is performed even in the starting period by soft start. Furthermore, the ON duty ratio of the FET Q1 rapidly becomes large so that a voltage equal to the pre-bias voltage is output. Thus, a step-up operation from the output side to the input side by a regenerative operation is not substantially performed. Even after the starting period ends, the synchronous rectifying operation continues although the reference voltage that has been rising becomes constant. Thus, in the DC-DC converter 1, a diode rectifying operation is not performed even if a pre-bias exists.

Figure 3:
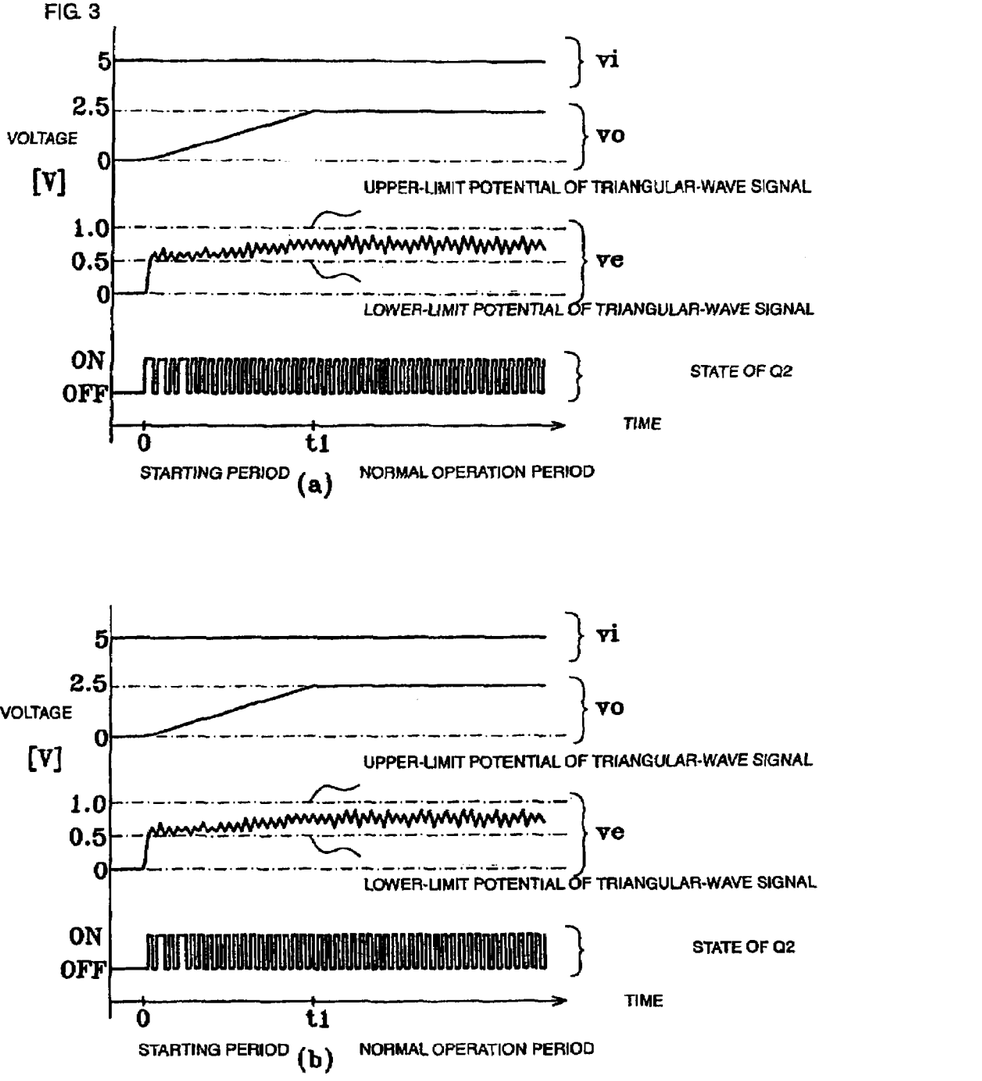
FIG. 3 shows signal waveforms in respective parts of the circuit, illustrating an operation of the DC-DC converter according to FIG. 2.
Figure 4:
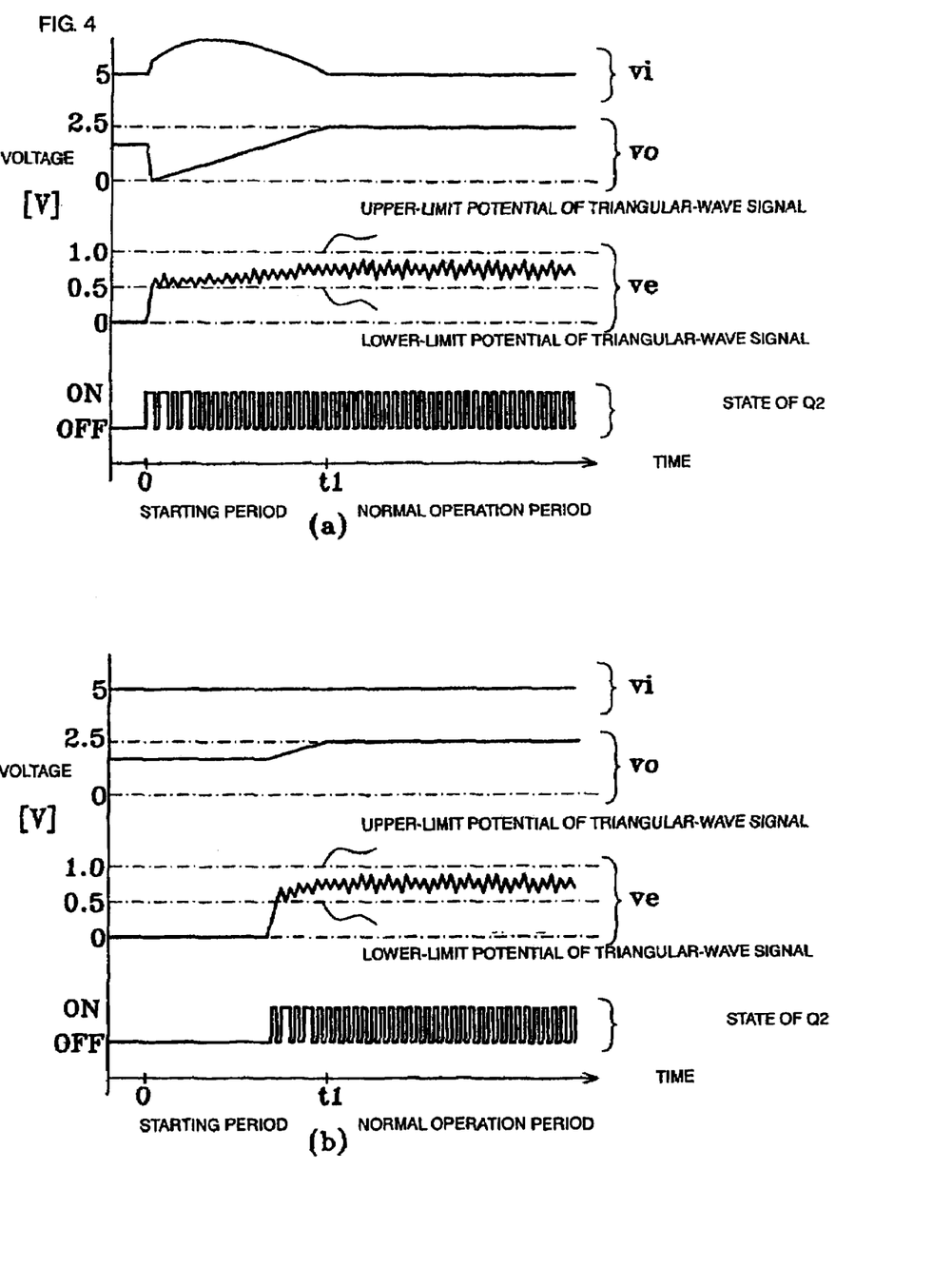
FIG. 4 shows signal waveforms in respective parts of the circuit, illustrating an operation of the DC-DC converter according to FIG. 2.

FIGS. 3 and 4 show an input voltage vi, an output voltage vo, an output of the error amplifier (indicated by reference symbol ve), and a switching state of the FET Q2 serving as a synchronous rectifying switching element at startup in the DC-DC converter 1, in the cases where a pre-bias exists and does not exist and where the regeneration preventing circuit is provided and is not provided. FIG. 3 shows a case where no pre-bias exists, in which (a) shows a case where the regeneration preventing circuit is not provided and (b) shows a case where the regeneration preventing circuit is provided. FIG. 4 shows a case where a pre-bias exists, in which (a) shows a case where the regeneration preventing circuit is not provided and (b) shows a case where the regeneration preventing circuit is provided.

When no pre-bias exists, as shown in FIGS. 3(a) and (b), the output voltage gradually rises in a starting period by soft start, reaches a predetermined value at time t1, and then that state is maintained in a normal operation period, regardless of the existence/absence of the regeneration preventing circuit. The output of the error amplifier rapidly rises just after startup and reaches a vicinity of a predetermined value (lower-limit potential of the triangular-wave signal), and an average thereof gradually increases in accordance with the output voltage of the soft start while the output fluctuates. After predetermined time, the output fluctuates, with a predetermined value (value depending on a relationship between the input voltage and the output voltage) between the upper and lower limits of the triangular-wave signal being the center.

When the pre-bias exists and when the regeneration preventing circuit is not provided, as shown in FIG. 4(a), the reference voltage is lower than the voltage of the voltage output terminal and thus the FET Q1 is controlled by the output of the error amplifier so as to be in an OFF-state for some time after startup. The FET Q2 is inevitably in an ON-state during that time, and thus a reverse current flows through the FET Q2 from the voltage output terminal via the choke coil L1 due to the pre-bias voltage. The flow of the reverse current causes the voltage of the voltage output terminal to drop. The drop of the voltage of the voltage output terminal causes the error amplifier to turn ON the FET Q1 and to turn OFF the FET Q2. Accordingly, electromagnetic energy accumulated in the choke coil L1 by the above-described reverse current causes a step-up operation from the output side to the input side, so that the voltage in the input side rises. After that, the output voltage rises as in the case where no pre-bias exists. The state of the high input voltage vi due to the step-up operation continues for a while.

On the other hand, when the pre-bias exists and when the regeneration preventing circuit is provided, as shown in FIG. 4(b), neither the FET Q1 nor the FET Q2 is turned ON for some time after startup. After the reference voltage of the error amplifier has reached a voltage corresponding to the pre-bias voltage, the output of the error amplifier rapidly rises and reaches the lower-limit potential of the triangular-wave signal. However, neither the FET Q1 nor the FET Q2 is turned on during that time because the regeneration preventing circuit is provided. Thus, a flow of a reverse current from the output terminal via the choke coil and the FET Q2 due to the pre-bias voltage can be prevented. After the output of the error amplifier exceeds the lower-limit potential of the triangular-wave signal, the FET Q1 is turned OFF and the FET Q2 is turned ON depending on timing, and the pre-bias voltage may cause a reverse current to flow from the output terminal via the choke coil and the FET Q2. However, the output of the error amplifier quickly rises to a level of outputting a voltage equal to the pre-bias voltage, and thus a regenerative operation by the pre-bias voltage is not substantially performed and the voltage in the input side does not rise. After that, the output voltage becomes higher than the pre-bias voltage, so that an operation same as that when no pre-bias exists is performed. As described above, when the regeneration preventing circuit is provided, a rise of the voltage in the input side due to the regenerative operation can be prevented even if the pre-bias exists.

Now, a case where a large load current suddenly becomes small during a normal operation in the DC-DC converter 1 is discussed. In this case, since the output voltage vo tries to rise, the output voltage of the error amplifier IC1 drops accordingly, and thus the ON duty ratio of the FET Q1 becomes small. At this time, the output of the comparator IC6 is kept at H level and the function of the regeneration preventing circuit 2 is stopped as long as the output of the error amplifier IC1 is not below the reference voltage va. Thus, the regenerative operation can be performed and a reverse current can flow through the FET Q2. Accordingly, a rise of the output voltage can be suppressed and the output voltage can be controlled at a stable voltage in a short time. As a result, the problem of Patent Document 1: a state where the output voltage is high continues for a long time, does not occur in the DC-DC converter 1.

Next, a case where startup is performed under a small load current and a soft start state changes to a normal operation state is discussed. In the DC-DC converter 1, the synchronous rectifying operation is performed even in a starting period by soft start, as described above. Thus, a regenerative operation is performed when a load current is small or zero, the direction of a current flowing through the choke coil L1 changes between a forward direction and a reverse direction, so that a current of not only a forward direction but also a reverse direction flows through the FETs Q1 and Q2. The ON duty ratio of the FET Q1 does not depend on a load current, but depends on a relationship between the input voltage and the output voltage. For example, in this embodiment, the set value of the output voltage is 2.5 V, and thus the ON duty ratio of the FET Q1 gradually increases toward 2.5 V (output voltage)/5 V (input voltage)=0.5 and becomes constant at 0.5. That is, the ON duty ratio of the FET Q1 does not become very small unlike in the case of Nonpatent Document 1. Even after the starting period ends, the operation of the FET Q2 does not change at all, although the reference voltage to be compared in the error amplifier IC1 is fixed to vref of 1.25 V. That is, the synchronous rectifying operation continues. Thus, a significant drop of the output voltage does not occur even if the load current of the DC-DC converter 1 is small at transition from the starting state to the normal operation state.

Second Embodiment

In the DC-DC converter 1 according to the first embodiment, a case where a large load current suddenly becomes small during a normal operation is reconsidered. In this case, the output voltage vo tries to rise, and thus the output voltage of the error amplifier IC1 drops accordingly. Although not described in the first embodiment, the output of the error amplifier IC1 may be below the reference voltage va if fluctuation of the load current is too significant. In this case, the ON duty ratio of the FET Q1 becomes zero, but the FET Q2 is turned OFF because the regeneration preventing circuit 2 functions in the DC-DC converter 1. In this case, no current is absorbed from the output side by the FET Q2, which can cause a problem that the risen output voltage does not easily drop. This is because the regeneration preventing circuit 2 can function under some conditions even in the normal operation state.

Figure 5:
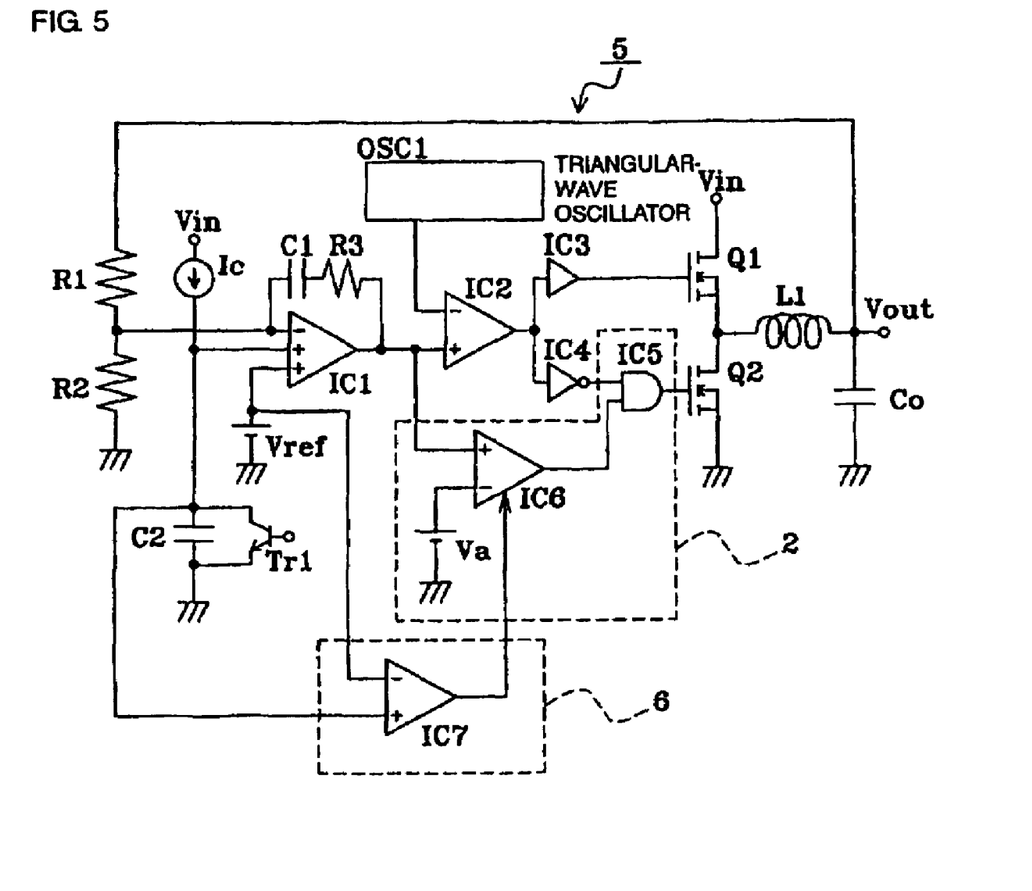
FIG. 5 is a circuit diagram of a DC-DC converter according to another embodiment of the present invention.

FIG. 5 is a circuit diagram of a DC-DC converter according to another embodiment of the present invention, serving as a DC-DC converter to solve this problem. In FIG. 5, parts that are the same as or equivalent to those in FIG. 2 are denoted by the same reference numerals, and the corresponding description is omitted.

The DC-DC converter 5 shown in FIG. 5 includes a regeneration preventing circuit stopping circuit 6 in addition to the components of the DC-DC converter 1 shown in FIG. 2. The comparator IC6 is provided with an enable terminal. The regeneration preventing circuit stopping circuit 6 includes a comparator IC7. An inverting input terminal of the comparator IC7 connects to the reference voltage source Vref, and the reference voltage vref is applied thereto. A non-inverting input terminal of the comparator IC7 connects to one end of the capacitor C2, so that a charging voltage of the capacitor C2 is applied thereto. The output of the comparator IC7 connects to the enable terminal of the comparator IC6. The comparator IC6 performs a normal operation when the enable terminal is at L level, and stops operating when the enable terminal becomes H level, so that the output is fixed to H level. Alternatively, the output terminal may have an open drain configuration or an open collector configuration, and a pullup resistor may be provided between the output terminal and the AND circuit IC5. H level in the enable terminal causes a high-impedance output, and thus the output may be substantially fixed to H level.

In the DC-DC converter 5 having the above-described configuration, the charging voltage of the capacitor C2 is lower than the reference voltage vref at startup in a soft start state, so that the output of the comparator IC7 becomes L level and the comparator IC6 performs a normal operation. That is, the regeneration preventing circuit stopping circuit 6 does not function and the regeneration preventing circuit 2 plays an expected role.

On the other hand, when the normal operation state starts after soft start, the charging voltage of the capacitor C2 becomes higher than the reference voltage vref, so that the output of the comparator IC7 becomes H level and the comparator IC6 does not operate thereafter. Accordingly, a signal input from the comparator IC6 to the AND circuit IC5 is fixed to H level. That is, the regeneration preventing circuit stopping circuit 6 functions, and the regeneration preventing circuit 2 stops functioning accordingly.

When the regeneration preventing circuit 2 does not function during the normal operation, the FET Q2 is turned ON when the FET Q1 is turned OFF. That is, when the output of the error amplifier IC1 is below the reference voltage va and when the ON duty ratio of the FET Q1 becomes zero during the normal operation, the FET Q2 can be turned ON and a reverse current can be flown. Thus, even if a large load current suddenly becomes small and the output voltage rises during the normal operation, a current can be absorbed from the output side by the FET Q2, so that the risen output voltage can be rapidly dropped and can be controlled to an original voltage.

In the DC-DC converter 5, the regeneration preventing circuit stopping circuit 6 controls an operation of the comparator 6 of the regeneration preventing circuit 2. However, another configuration may be used as long as the function of the regeneration preventing circuit 2 can be stopped. For example, AND operation may be performed on the output of the comparator IC6 and the output of the comparator IC7, and the result may be applied to the AND circuit IC5. Alternatively, a timer circuit according to a time constant of soft start may be used instead of the comparator IC7 so that the regeneration preventing circuit 2 functions only for a predetermined period from startup.

Although a step-down DC-DC converter is used in the first and second embodiments, a step-up DC-DC converter may be used as the DC-DC converter of the present invention. The same operation can be performed in that case.

Although the present invention has been described in relation to particular embodiments thereof, many other variations and modifications and other uses will become apparent to those skilled in the art. Therefore, the present invention is not limited by the specific disclosure herein.

What is claimed is:

1. A DC-DC converter comprising:
   a main switching element; a synchronous rectifying switching element;
   a choke coil;
   an error amplifier which compares a voltage corresponding to an output voltage with a reference voltage and outputs an error component;
   an oscillator which outputs an oscillator signal periodically fluctuating within a predetermined voltage range;
   a comparator that compares the output of the error amplifier with the oscillator signal and alternately turns ON and OFF the main switching element and the synchronous rectifying switching element on the basis of the comparison result so as to control the output voltage; and
   a regeneration preventing circuit which brings the synchronous rectifying switching element to an OFF-state when the output of the error amplifier deviates from the voltage range of the oscillator signal in a direction of a smaller ON duty ratio of the main switching element.

2. The DC-DC converter according to claim 1, wherein the reference voltage is set so as to rise from zero for a predetermined time period after startup and to become constant after reaching a predetermined voltage corresponding to a set output voltage.

3. The DC-DC converter according to claim 2, further comprising a stopping circuit for said regeneration preventing circuit to stop an operation of the regeneration preventing circuit after the reference voltage has reached the predetermined voltage after startup.

4. The DC-DC converter according to claim 1, further comprising a stopping circuit for said regeneration preventing circuit to stop an operation of the regeneration preventing circuit.

* * * * *